US009932421B2

(12) United States Patent
Durant et al.

(10) Patent No.: US 9,932,421 B2
(45) Date of Patent: Apr. 3, 2018

(54) EMULSION POLYMERIZATION OF ESTERS OF ITACONIC ACID

(71) Applicant: Itaconix Corporation, Stratham, NH (US)

(72) Inventors: Yvon Durant, Lee, NH (US); Bo Jiang, Newmarket, NH (US); John Tsavalas, Portsmouth, NH (US)

(73) Assignee: Itaconix Corporation, Stratham, NH (US)

( * ) Notice: Subject to any disclaimer, the term of this patent is extended or adjusted under 35 U.S.C. 154(b) by 0 days.

(21) Appl. No.: 15/151,960

(22) Filed: May 11, 2016

(65) Prior Publication Data

US 2016/0333127 A1     Nov. 17, 2016

Related U.S. Application Data

(60) Provisional application No. 62/159,514, filed on May 11, 2015.

(51) Int. Cl.

| C08F 222/10 | (2006.01) |
| C08F 22/16 | (2006.01) |
| C08F 222/16 | (2006.01) |
| C08F 265/06 | (2006.01) |
| C08F 265/04 | (2006.01) |

(52) U.S. Cl.
CPC ............ C08F 22/16 (2013.01); C08F 222/16 (2013.01); C08F 265/04 (2013.01); C08F 265/06 (2013.01)

(58) Field of Classification Search
CPC ...... C08F 22/16; C08F 222/16; C08F 265/04; C08F 265/06

USPC ........................................................ 526/325
See application file for complete search history.

(56) References Cited

U.S. PATENT DOCUMENTS

| 8,227,560 B2 | 7/2012 | Durant et al. |
| 8,410,232 B2 | 4/2013 | Durant |
| 8,420,758 B2 | 4/2013 | Durant et al. |
| 2013/0065070 A1* | 3/2013 | Nabuurs ............... C08F 265/04 428/522 |

(Continued)

FOREIGN PATENT DOCUMENTS

| WO | 2011073417 | 6/2011 |
| WO | 2014143773 | 9/2014 |

OTHER PUBLICATIONS

Tomohiro Hirano, Sachiko Tateiwa, Makiko Seno and Tsuneyuki Sato, "Temperature Dependence of Stereospecificity in the Radical Polymerization of Di-n-butyl Itaconate in Bulk," Journal of Polymer Science Part A: Polymer Chemistry vol. 38, Issue 13, pp. 2487-2491, Jul. 1, 2000.

(Continued)

*Primary Examiner* — Lanee Reuther
*Assistant Examiner* — Chun-Cheng Wang
(74) *Attorney, Agent, or Firm* — Grossman, Tucker, Perreault & Pfleger, PLLC (57) ABSTRACT

The present disclosure relates to a method for the emulsion polymerization of itaconic acid containing ester functionality, for example, the alkyl esters of itaconic acid known as alkylitaconate. More specifically, an ester of polyitaconic acid polymer is produced via emulsion polymerization and contains greater than 50% by weight of an ester of itaconic acid along with a selected particle size and levels of molecular weight and syndiotacticity.

3 Claims, 2 Drawing Sheets

(56) References Cited

U.S. PATENT DOCUMENTS

2014/0370317 A1    12/2014    Nabuurs et al.

OTHER PUBLICATIONS

Tomohiro Hirano, Kazuhiro Furuya, Makiko Seno and Tsuneyuki Sato, "13C NMR and Electron Spin Resonance Analyses of the Radical Polymerization of Diisopropyl Itaconate," Journal of Polymer Science Part A: Polymer Chemistry vol. 40, Issue 24, pp. 4513-4522, Dec. 15, 2002.
Tomohiro Hirano, Ryoko Takeyoshi, Makiko Seno and Tsuneyuki Sato, "Chain-Transfer Reaction in the Radical Polymerization of Di-n-butyl Itaconate at High Temperatures," Journal of Polymer Science Part A: Polymer Chemistry vol. 40, Issue 14, pp. 2415-2426, Jul. 15, 2002.
Tomohiro Hirano, Kousuke Higashi, Makiko Seno and Tsuneyuki Sato, "Effect of Hydrogen-Bonding Interaction on Radical Polymerization of Di-n-butyl Itaconate," Journal of Polymer Science Part A: Polymer Chemistry vol. 41, Issue 21, pp. 3463-3467, Nov. 1, 2003.
Tomohiro Hirano*, Kousuke Higashi, Makiko Seno and Tsuneyuki Sato, "Reaction Control in Radical Polymerization of Di-n-butyl Itaconate Utilizing a Hydrogen-Bonding Interaction," Journal of Polymer Science Part A: Polymer Chemistry vol. 42, Issue 19, pp. 4895-4905, Oct. 1, 2004.
International Search Report and Written Opinion dated Aug. 18, 2016 issued in related International Patent Application No. PCT/US16/31798.

* cited by examiner

EMULSION POLYMERIZATION OF ESTERS OF ITACONIC ACID

CROSS-REFERENCE TO RELATED APPLICATIONS

This application claims the benefit of U.S. Provisional Patent Application Ser. No. 62/159,514, filed on May 11, 2015, which is fully incorporated herein by reference.

GOVERNMENT RIGHTS CLAUSE

This invention was made with Government support under (grant IIP-1353592) awarded by the National Science Foundation. The Government has certain rights to this invention.

FIELD OF THE INVENTION

The present invention relates to the polymerization of itaconic acid containing ester functionality, for example, the alkyl esters of itaconic acid known as alkylitaconate. More specifically, an ester of polyitaconic acid polymer is produced via emulsion polymerization and contains greater than 50% by weight of an ester of itaconic acid along with a selected particle size and levels of molecular weight and syndiotacticity.

BACKGROUND

U.S. Pat. No. 8,227,560 reports on methods and polymers based upon vinyl type monomers that contain pendant carboxylic acid groups and ester group functionality, such as the polymerization of itaconic acid. The polymers are prepared under selected conditions of partial neutralization to provide relatively high conversions and/or relatively high values of molecular weight and/or selected amounts of repeating unit tacticity.

U.S. Pat. No. 8,410,232 reports on esters of itaconic acid as suitable for polymerization in aqueous medium in the presence of seed particles. The seed particles were indicated as absorbing the monomer and polymerizing to a desired particle size.

The sensitivity of polymerizing esters of itaconic acid to its polymerization media has been evaluated by Hirano et al, who reported on a pronounced dependence of stereospecificity in the radical polymerization of dibutyl itaconate (DBI) on polymerization temperature. T. Hirano, S. Tateiwa, M. Seno and T. Sato, Journal of Polymer Science Part A: Polymer Chemistry Volume 38, Issue 13, pages 2487-2491, 1 July 2000. More specifically, the bulk polymerization and formation of poly(dibutyl itaconate) was studied and showed a temperature dependence of tacticity. In subsequent studies, it was determined that radical polymerization of di-n-butyl itaconate indicated unexpected resonances (C-resonances) in 13C NMR spectra at temperatures higher than 60° C., the presence of intramolecular chain transfer which took place more frequently at high temperature in the polymerization of itaconates with bulkier ester groups. See, Tomohiro Hirano, Kazuhiro Furuya, Makiko Seno and Tsuneyuki Sato, Journal of Polymer Science Part A: Polymer Chemistry Volume 40, Issue 24, pages 4513-4522, 15 Dec. 2002, "13C NMR and Electron Spin Resonance Analyses of the Radical Polymerization of Diisopropyl Itaconate" and Tomohiro Hirano, Ryoko Takeyoshi, Makiko Seno and Tsuneyuki Sato, Journal of Polymer Science Part A: Polymer Chemistry Volume 40, Issue 14, pages 2415-2426, 15 Jul. 2002, "Chain-Transfer Reaction in the Radical Polymerization of Di-n-butyl Itaconate at High Temperatures." In addition, radical polymerization of dibutyl itaconate was examined in the presence of amide compounds that could complex with DBI monomer via hydrogen-bonding interaction, which was described to result in a change in the population of the propagating radical with a syndiotactic sequence. See, Tomohiro Hirano, Kousuke Higashi, Makiko Seno and Tsuneyuki Sato, Journal of Polymer Science Part A: Polymer Chemistry Volume 41, Issue 21, pages 3463-3467, 1 Nov. 2003, "Effect of Hydrogen-Bonding Interaction on Radical Polymerization of Di-n-butyl Itaconate" and Tomohiro Hirano*, Kousuke Higashi, Makiko Seno and Tsuneyuki Sato, Journal of Polymer Science Part A: Polymer Chemistry Volume 42, Issue 19, pages 4895-4905, 1 October 2004, "Reaction Control in Radical Polymerization of Di-n-butyl Itaconate Utilizing a Hydrogen-Bonding Interaction."

In view of the relatively highly sensitive nature of itaconate ester monomers to polymerizing conditions in the bulk, one objective herein was to consider the use of emulsion polymerization with associated temperature control to determine if an emulsion environment could provide poly(alkylitaconates) at selected particle size, free acidic content, relatively high molecular weight, relatively high conversion and/or relatively high levels of syndiotactic placement.

SUMMARY

A method for polymerization comprising:

(a) supplying a first monomer having the following structure:

wherein $R_1$ and $R_2$ are selected from an alkyl group or an aromatic group or a cyclic alkyl group and combinations thereof and $R_3$ is selected from an alkyl group, aromatic functionality, heteroaromatic functionality, cyclic alkyl group, heterocyclic group or combinations thereof;

(b) a second monomer having the following structure:

wherein $R_4$ is selected from a hydrogen, alkyl group, aromatic group or itself providing carboxylic acid functionality;

(c) optionally, one or more monomers comprising a radically polymerizable vinyl type monomer;

forming an emulsion of (a), (b) and optionally (c) by placing said monomers in water along with a surfactant and a water soluble free radical initiator and polymerizing said monomers and forming a corresponding random copolymer structure:

wherein $R_5$ is a hydrogen atom or an alkyl group or a substituent containing a vinyl group and $R_6$ is an aromatic ring, an ester group, a nitrile group, a substituent containing a vinyl group and/or an acetate group, the value of "a" is such that the indicated repeat unit is present at a level of greater than 50 wt. %, the value of "b" is such that the indicated repeat unit is present at a level of 0.05 to 5.0 wt. %, and the balance is repeat unit "c" which may be present at a level of 0.0 wt % to 49.85 wt. %; and wherein said polymeric structure is in the form of particles having a particle size of 10 nm to 900 nm and at a weight average molecular weight value of greater than or equal to 30,000 g/mol.

DETAILED DESCRIPTION

One of the monomer structures that may be polymerized in the emulsion procedures of the present invention is as follows:

In the above, $R_1$ and $R_2$ may both be selected from an alkyl group or an aromatic group or a cylic alkyl group and combinations thereof and $R_3$ is selected from an alkyl group, aromatic functionality, heteroaromatic functionality, cyclic alkyl group, heterocyclic group or combinations thereof. Accordingly, the above monomer provides a monomer that defines ester type functionality of the carboxylate group, where the particular ester functionality can be varied depending upon the selection of $R_1$ and $R_2$. Preferably, $R_1$ and $R_2$ are selected from n-alkyl and/or iso-alkyl groups, including, e.g., methyl, ethyl, propyl, butyl, pentyl, hexyl, heptyl, and octyl type functionality. The level of such first co-monomer in the ensuing polymer composition (described below) is preferably greater than 50% by weight. Accordingly, the first co-monomer noted above may preferably be present at a level of 50.1 wt. % to 99.95 wt. %.

One particularly preferred monomer for use in the emulsion polymerization procedures herein is di-n-butyl itaconate (DnBI), having the following general structure, wherein $R_3$ is a methylene group:

In addition, the present disclosure contemplates the use of a second co-monomer in the emulsion polymerization, which co-monomer is preferably one that provides vinyl based acid functionality. This may therefore comprise any vinyl monomer that provides acidic functionality, which acidic functionality can include organic acid functionality (—COOH) and/or inorganic acidity (—SO$_3$H, —PO$_3$H). Preferably, one may therefore include a second co-monomer selected from acrylic acid, methacrylic acid, itaconic acid, fumaric acid, vinylphosphonic acid and/or styrene sulfonic acid. In addition, such second co-monomer is preferably employed such that it is present at a level of 0.05 wt. % to 5.0 wt. % in the ensuing final polymer composition. More preferably, such co-monomer may be present in the final polymer composition at a level of 0.1 wt. % to 4.0 wt. %, and most preferably at a level of 0.15 wt. % to 3.0 wt. %.

One preferred second co-monomer providing vinyl based acid functionality may have the following structure:

where $R_4$ may be a hydrogen, alkyl group, aromatic group, or itself a group providing carboxylic acid functionality, such as —CH$_2$COOH. It is also worth noting that the above reference use of vinyl monomer that provides acidic functionality is selected such that when the ensuing polymer latex is employed as, e.g., a coating, and is applied to a given surface under relatively high shear such as 1,000 sec$^{-1}$ or higher, or in the range of 1,000 sec$^{-1}$ to 1×10$^6$ sec$^{-1}$ such latex indicates shear stability. Reference to shear stability should be understood as avoiding the coagulation of the latex such that the polymer and water environment phase separate and the dispersion is lost. In addition, the presence of the indicated acid functionality separately promotes adhesion to given surface, such as glass, metals, fibers, etc., where the surface has polar functionality attracting the acidic group. Furthermore, operation above 5.0 wt. % of vinyl monomer that provides acidic functionality will lead to polymer systems that are hydroscopic and absorb excessive levels of water.

Furthermore, the present disclosure further contemplates that, optionally, one or more co-monomers may be included in the ensuing emulsion polymerization, which co-monomers may include any radical polymerizable vinyl monomer, including, but not limited to and one or more of styrene, acrylonitrile, vinyl acetate, acrylates, methacrylates and/or difunctional vinylic monomers such as divinyl benzene or ethylene glycoldimethacrylate. The level of such additional co-monomers in the ensuing polymer may preferably be at a level of 0.0 wt. % to 49.85 wt. %.

It may therefore be appreciated from the above that the ensuing polymer structure formed by the emulsion procedure herein may have the following general structure:

In the above, $R_1$, $R_2$, $R_3$, $R_4$ are as previously described. $R_5$ may be a hydrogen atom or an alkyl group and $R_6$ may be an aromatic ring, an acrylate group, and/or and acetate group. The value of "a" is preferably such that the indicated repeat unit is present at a level of greater than 50 wt. %, the value of "b" is such that the indicated vinyl monomer containing one more acid substituents is preferably present at a level of 0.05 to 5.0 wt. %, and the balance is repeat unit "c" which may be present at a level of 0.0 wt % to 49.85 wt. %. Accordingly, repeat unit "c" should be understood as optional. Preferably, repeat unit "c" is selected from styrene, acrylonitrile, acrylates, methacrylates and vinyl acetate. In addition, when repeat unit "c" as indicated includes two substituents containing vinyl functionality, repeat unit "c" is only present at a level of up to 10.0 wt. %, and more preferably in the range of 0.1 to 10.0 wt. %, and even more preferably, 0.1 to 5.0 wt. %.

One particularly preferred composition is as follows:

In the above the value of "a" is preferably at a level greater than 60% to 99.95 wt. %, the value of "b" is preferably present at a level of 0.5 to 2.0 wt %, and the balance is repeat unit "c" which is preferably present at a level of below 39.5% to 0.0 wt %. In addition, $R_5$ and $R_6$ are preferably hydrogen or methyl and an alkyl carboxylate respectively.

It is next noted that the emulsion polymerization herein is one that is conducted to provide controlled particle size, meaning a particle size that preferably falls in the range of 10 nm to 900 nm, more preferably 30 nm to 600 nm, and most preferably, in the range of 50 nm to 500 nm. Moreover, the control of particle size in this range is found to provide relatively faster polymerization kinetics, and in particular, relatively faster polymerization kinetics than a corresponding bulk polymerization procedure. This is discussed more fully herein.

The emulsion polymerization herein is also one that is conducted in a manner that can promote a desired level of tacticity with respect to the analysis of triad structure by NMR techniques. More specifically, using the emulsion polymerization techniques herein, it has been found that one may form relatively more $^{13}C$ NMR syndiotactic triads when the emulsion polymerization temperature is at a relatively reduced temperature. Preferably, relatively greater amounts of syndiotactic $^{13}C$ NMR triads are observed when the temperature is reduced from, e.g. 80° C. to 60° C. Accordingly, in the broad context of the present disclosure, relatively greater amounts of syndiotacticity are promoted when the aforementioned monomers are combined at the compositional options recited herein at temperatures at or below 60° C., to promote relatively higher levels of syndiotactic placement.

The emulsion polymerizations herein are also ones that have been found to provide relatively low levels of residual monomer content. In particular, the emulsion polymerization procedures as applied to the compositions noted herein have been found to provide a residual monomer content in the range of 0.001 wt. % and 15.0 wt. %.

WORKING EXAMPLES

A number of experiments are discussed below, which make reference to comparative examples utilizing bulk polymerization as compared to the emulsion polymerization techniques of the present disclosure. While poly(di-n-butyl itaconate) was used as an exemplary monomer, it is contemplated that the results herein apply to the general compositions noted herein, including the aforementioned copolymer type structures.

Example 1

Bulk Polymerization and Formation of PDnBI at 80° C.

To 10 grams of di-n-butyl itaconate was added 0.05 gram of AIBN in a 20 ml vials. The sample was heated to 80° C. for 48 hours. The sample was dissolved in 99.9% isopropanol and subsequently participated in water. 0.4 gram of polymer was recovered and analyzed. Conversion by GPC Integration: 56%.

Example 2

Emulsion Polymerization and Formation of PDnBI at 80° C.

To a 1 L round bottom flask was added 233 grams of water, 62.6 grams of di-n-butyl itaconate, 2.4 grams of sodium dodecyl diphenyl oxide disulfonate, 2.4 grams of polyoxyethylene (10) oleyl ether, 1.45 grams of a low molecular weight precooked water soluble starch, and 1.2 gram of sodium persulfate. The mixture was batched at 80° C. for 2 hours. 58.3 grams of water, 208.6 grams of di-n-butyl itaconate, 4.9 grams of sodium dodecyl diphenyl oxide disulfonate, 4.9 grams of polyoxyethylene (10) oleyl ether, and 1.2 gram of sodium persulfate was fed continuously over the subsequent 12 hours. The mixture was held at 80° C. for another 7 hours after feeding. 2 grams of the latex was cleaned by a 3.5K MWCO dialysis cassette over 2 days. 0.4 gram of polymer was recovered and analyzed. Particle size was determined by dynamic light scatterring (Nanotrac® UPA): mean particle diameter, volume average Dv=133 nm, mean particle diameter, number average Dn=86 nm. Solid content: 45% by moisture analysis. Conversion by GPC Integration: 85.4%.

Example 3

Bulk Polymerization and Formation of PDnBI at 60° C.

To 10 grams of di-n-butyl itaconate was added 0.05 gram of AIBN in a 20 ml vials. Sample was heated to 60° C. for 48 hours. Sample was dissolved in 99.9% isopropanol and subsequently participated in water. 0.4 gram of polymer was recovered and analyzed. Conversion by GPC Integration: 52%.

Example 4

Emulsion Polymerization and Formation of PDnBI at 60° C.

To a 1 L round bottom flask was added 233 grams of water, 62.6 grams of di-n-butyl itaconate, 2.4 grams of sodium dodecyl diphenyl oxide disulfonate, 2.4 grams polyoxyethylene (10) oleyl ether, 1.45 grams of a low molecular weight precooked water soluble starch, and 1.2 gram of sodium persulfate. The mixture was batched at 60° C. for 2 hours. 58.3 grams of water, 208.6 grams of di-n-butyl itaconate, 4.9 grams of sodium dodecyl diphenyl oxide disulfonate, 4.9 grams of polyoxyethylene (10) oleyl ether, and 1.2 gram of sodium persulfate was fed continuously over the subsequent 12 hours. The mixture was held at 60° C. for another 7 hours after feeding. 2 grams of the latex was cleaned by a 3.5K MWCO dialysis cassette over 2 days. 0.4 gram of polymer was recovered and analyzed. Particle size by Nanotrac® UPA: Dv=127 nm, Dn=100 nm. Solid content: 41% by moisture analysis. Conversion by GPC integration: 91.6%.

Example 5

Bulk Polymerization and Formation of A Copolymer of PDnBI and PDiBI at 60° C.

To 4 grams of di-n-butyl itaconate and 6 grams of di-iso-butyl itaconate mixture was added 0.05 gram of AIBN in a 20 ml vials. Sample was heated to 60° C. for 48 hours. Sample was dissolved in 99.9% isopropanol and subsequently participated in water. 0.4 gram of polymer was recovered and analyzed. Sample is identified herein a COP 60C Bulk.

Example 6

Emulsion Polymerization and Formation of A Copolymer of PDnBI and PDiBI at 60° C.

To a 1 L round bottom flask was added 233 grams of water, 25 grams of di-n-butyl itaconate, 37.6 grams of di-iso-butyl itaconate, 2.5 grams of methacrylic acid, 2.4 grams of sodium dodecyl diphenyl oxide disulfonate, 1.2 grams of polyoxyethylene (10) oleyl ether, 1.45 grams of a low molecular weight precooked water soluble starch, and 1.2 gram of sodium persulfate. The mixture was batched at 60° C. for 2 hours. 58.3 grams of water, 83.4 grams of di-n-butyl itaconate, 125.2 grams of di-iso-butyl itaconate, 4.9 grams of methacrylic acid, 4.9 grams of sodium dodecyl diphenyl oxide disulfonate, 2.45 grams of polyoxyethylene (10) oleyl ether, and 1.2 gram of sodium persulfate was fed continuously over the subsequent 12 hours. The mixture was held at 60° C. for another 7 hours after feeding. 2 grams of the latex was cleaned by a 3.5K MWCO dialysis cassette over 2 days. 0.4 gram of polymer was recovered and analyzed. Particle size by Nanotrac® UPA: Dv=140 nm, Dn=82 nm. Solid content: 39% by moisture analysis. Conversion by GPC integration: 88.7%. This sample is identified as COP 60C LTX.

Example 7

Emulsion Polymerization and Formation of A Copolymer of Poly (nBI, iBI, BA, MAA) at 60° C.

To a 5 L jacketed reactor was added 1337.1 grams of seed latex (formulation below). The reactor is held at 60° C. 628.6 grams of water, 720 grams of di-n-butyl itaconate, 480 grams of di-iso-butyl itaconate, 32 grams of methacrylic acid, 28 grams of sodium dodecyl diphenyl oxide disulfonate, 14.3 grams of polyoxyethylene (10) oleyl ether, and 6.9 gram of sodium persulfate was fed continuously over 12 hours. The mixture was held at 60° C. for another 2.5 hours after feeding, and the temperature is raised to 73.6° C. To the reactor was added 1.71 g sodium persulfate with 57 grams of water. 171.4 grams of butyl acrylate was fed continuously to the reactor over the subsequent 2 hours. The reaction is held at 73.6° C. for another 4 hours to complete. Particle size by Nanotrac® UPA: Dv=81 nm, Dn=64 nm. Solid content: 46% by moisture analysis. Conversion by GPC integration: 87.2%. This sample was designated COP+BA 60C LTX.

Formulation of the seed latex: To a 5 L jacketed reactor was added 2812 grams of water, 253 grams of di-n-butyl itaconate, 168.8 grams of di-iso-butyl itaconate, 28.2 grams of ethylene glycol dimethylacrylate, 33.8 grams of sodium dodecyl diphenyl oxide disulfonate, 16.8 grams of polyoxyethylene (10) oleyl ether, and 8.4 gram of sodium persulfate. The mixture was batched at 60° C. for 12 hours.

Example 8

To a 1 L round bottom flask was added 234 grams of seed latex (see example 7), 0.6 grams of sodium persulfate and 60 grams of water. The reactor is held at 60° C. 50 grams of water, 240 grams of di-n-butyl itaconate, 4.8 grams of methacrylic acid, 4.9 grams of sodium dodecyl diphenyl oxide disulfonate, 2.5 grams of polyoxyethylene (10) oleyl ether, and 0.6 gram of sodium persulfate was fed continuously over 12 hours. The mixture was held at 60° C. for another 7 hours after feeding to complete. Particle size by Nanotrac® UPA: Dv=84 nm, Dn=71 nm. Solid content: 42.3% by moisture analysis.

$^{13}$C NMR Analysis

13C NMR analysis was employed to determine tacticity for the above referenced samples. Each sample was dissolved in CDCl$_3$ as solvent in a 5 mm NMR tube. The Instrument used is a Varian Mercury 400 operating at a carbon frequency of 100.52 MHz. The probe is a broadband probe tuned to $^{13}$C and $^1$H (ATB_PFG400). The experiment was a 1D, with a pulse sequence s2pul. Receiver gain was set to 24. Sample temperature was 55° C. Relaxation delay was set to 12 seconds and the pulse width was set to 2.4 microseconds. Total number of scans was 4728 over 18 hours. The data was imported into Varian Mnova NMR processing software version 10.0. The processed data contains 64K data points and a 10 Hz exponential multiplier (line broadening), and a polynomial baseline correction were applied prior to line fitting. A de-convolution software assigned peak height and peak width with minimal residue (error) for the spectral region from 168 to 178 ppm. The peak areas where used to calculate the fraction of racemic triads.

$^{13}$C NMR Interpretation: According to the work of Hirano noted herein, Tomohiro the following stereotactic triads are assigned to the carbonyl in alpha position to the polymer backbone: syndiotactic triad "rr" from 174.9 to 175.9 ppm, heterotactic triad "mr" from 174.3 to 174.9 and isotactic traid "mm" from 173.4 to 174.3 ppm. Syndio tacticity is calculated by the Bernoulli process based on the probability of meso diads "mm": Psyndiotactic=(1-mm)^2. A polymer exhibiting a syndiotacticity greater than 0.5625 is considered to be preferentially syndiotactic.

Carbon 13 NMR Results

| Sample name | syndiotactic triad rr | heterotactic triad mr | isotactic triad mm | Syndiotacticity $(1-Pm)^2$ |
|---|---|---|---|---|
| PDnBI bulk 80C | 21% | 47% | 31% | 0.47 |
| PDnBI 80C LTX | 13% | 52% | 35% | 0.42 |
| PDnBI Bulk 60C | 31% | 53% | 16% | 0.71 |
| PDnBI 60C LTX | 34% | 48% | 18% | 0.67 |
| COP 60C Bulk | 35% | 52% | 12% | 0.77 |
| COP 60C LTX | 34% | 48% | 18% | 0.68 |
| COP + BA 60C LTX | 33% | 45% | 22% | 0.61 |

As can be seen from the above, using the emulsion polymerization techniques herein, it has been found that one may form relatively more $^{13}C$ NMR syndiotactic triads when the emulsion polymerization temperature is at a relatively reduced temperature. In particular, emulsion polymerization at a temperature of 60° C. indicated that the level of $^{13}C$ NMR syndiotactic triads was greater than or equal to 67%. Accordingly, it is contemplated herein that one may now readily increase the temperature from 60° C. to a higher temperature (e.g. 70° C.) to achieve $^{13}C$ NMR syndiotactic triad levels that are lower, but still equal to or above 58%, or equal to or greater than 61%, or as noted, equal to or greater than 67%.

Molecular Weight Analysis

Molecular weight was analyzed by multi-angle light scattering in conjunction with gel permeation chromatography (MALS-GPC). WYATT Technology miniDAWN TREOS. dn/dc (mL/g)=0.068. Samples were prepared by dissolution in tetrahydrofuran. Eluent flow rate: 0.350 ml/min. Refractive index detection was employed. Mn is reference to number average molecular weight. Mp is reference to peak molecular weight (i.e. the highest peak molecular weight on the graph of molecular weight versus elution volume). Mw is reference to weight average molecular weight.

MW Analysis

| Sample | Dn/Dc (ml/g) | Mn (g/mole) | Mp (g/mole) | Mw (g/mole) |
|---|---|---|---|---|
| PDnBI bulk 80C | 0.068 | 23,680 | 26,030 | 28,940 |
| PDnBI 80C LTX | 0.068 | 17,420 | 18,950 | 22,600 |
| PDnBI Bulk 60C | 0.068 | 134,600 | 150,500 | 161,500 |
| PDnBI 60C LTX | 0.068 | 69,330 | 77,860 | 112,200 |
| COP 60C Bulk | 0.068 | 70,900 | 200,000 | 240,000 |
| COP 60C LTX | 0.068 | 50,300 | 100,000 | 152,000 |
| COP + BA 60C LTX | 0.068 | 45,400 | 83,000 | 170,000 |

As can be seen from the above, emulsion polymerization procedures herein as applied to the indicated polymerization of itaconic acid monomers containing ester functionality indicates that MW values are increased as the temperature of the polymerization is reduced. More specifically, as the temperature of the emulsion polymerization is reduced from, e.g. 80° C. to 60° C., it can be seen that the sample PDnBI 80C LTX indicated a pronounced increased in MW values for all measured molecular weight parameters, Mn, Mp and Mw. It may therefore be appreciated that by application of the emulsion polymerization procedures herein, one may polymerize the identified itaconic acid monomers having ester functionality such that the value of Mw obtained is greater than or equal to 30,000. It is therefore contemplated that the value of Mw obtained by the emulsion polymerization procedures herein may fall in the range of 30,000-1,000,000 preferably between 40,000 and 1,000,000, most preferably between 50,000 and 500,000. It is also worth noting that in the case that the emulsion polymerized monomers herein include a di-vinyl monomer, the ensuing polymers formed herein may be such that they are formed as microgels (i.e. crosslinked particles) that are generally insoluble and not accounted in the molecular weight range reported herein but still fall within the scope of the present disclosure.

Figure 1:
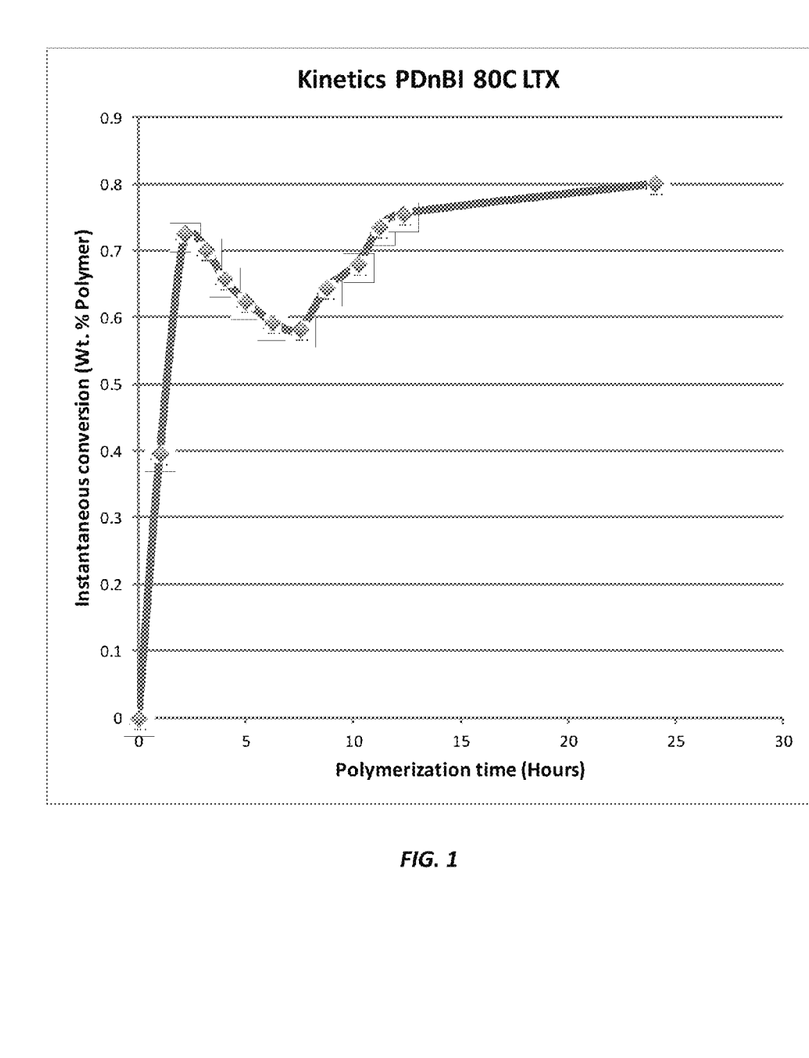
FIG. 1 is a plot of instantaneous conversion (wt. % polymer) versus polymerization time for the polymerization of poly-di-n-butyl itaconate at 80° C. by emulsion polymerization.

Attention is next directed to FIG. 1 which is a plot of the instantaneous conversion (wt. % polymer) versus polymerization time, for the data identified in the table below for emulsion polymerization of di-n-butyl itaconate (PDnBI) at 80° C. Reference to instantaneous conversion is reference to the ratio of polymer over polymer and monomer combined at any given point in time, irrelevant of the intent of adding further monomer later during the described fed-batch emulsion polymerization

Polymerization Time v. Instantaneous Conversion (PDnBI)

| Polymerization time (Hours) | Instantaneous Conversion |
|---|---|
| 0 | 0.00 |
| 1 | 0.40 |
| 2.16 | 0.73 |
| 3.16 | 0.70 |
| 4 | 0.66 |
| 5 | 0.63 |
| 6.25 | 0.59 |
| 7.5 | 0.58 |
| 8.75 | 0.64 |
| 10.2 | 0.68 |
| 11.23 | 0.74 |
| 12.3 | 0.76 |
| 24 | 0.80 |

Attention is next directed to FIG. 2 which is a plot of the instantaneous conversion (wt. % polymer) versus polymerization time, for the data identified in the table below for emulsion polymerization of di-n-butyl itaconate (PDnBI) in a seed particle system at 60° C. according to Example 8.

| Polymerization time (Hours) | Instantaneous Conversion |
|---|---|
| 0 | 1.00 |
| 1 | 0.75 |
| 2 | 0.57 |
| 3 | 0.57 |
| 4 | 0.55 |
| 5 | 0.57 |
| 6 | 0.56 |
| 7 | 0.59 |
| 8 | 0.62 |
| 9 | 0.62 |
| 10 | 0.60 |
| 11 | 0.60 |
| 12 | 0.62 |
| 19 | 0.89 |

As can be seen from the above, in the seeded particle emulsion, one starts with 100% polymer in the form of the seed. Upon addition of monomer, the polymerization begins, and the instantaneous conversion is observed to be relatively high (0.75), meaning that 75% of the monomer introduced has polymerized. This instantanous conversion then drops to 0.57, meaning that 57% of all the monomer now introduced has polymerized. It can be observed that the instantaneous conversion then levels off around 0.56, meaning that 56% of the monomer added has been converted to polymer. Further addition of monomer does not generally alter this value. At 12 hours the addition of monomer is complete at which point the instantaneous conversion increases, meaning that the polymerization proceed and begins to exhaust the available monomer.

In a typical bulk batch polymerization, such as the bulk examples of this disclosure, polymerization is initiated with 100% monomer. Dialkyl itaconate monomers are relatively slow polymerizing monomers, it takes extended periods of time to reach noticeable conversions. More specifically, after 48 of bulk polymerization time, conversions are typically below 56% as observed in Example 1 and 3 for for bulk polymerization of DnBI.

In the emulsion polymerization reported herein, such as all the latex examples of this application, polymerization is initiated in the water phase and then rapidly the growing polymeric radical enters a swollen micelle, or a polymeric nanoparticle. Within about the first 10-15 minutes of such polymerization a balance between polymerization rate ($R_{polym.}$) and monomer addition rate ($R_{monomer\ addition}$) is created. With the continuous (typically uniform) addition of monomer to the reacting emulsion polymerization, a balance is achieved between polymerization within nanoparticles and monomer addition to the reactor. This results in a monomer concentration that is typically maintained at or below 44.0 wt. % of the composition of a reacting polymer nanoparticle during the emulsion polymerization procedure. For example, if 10 graphs of polymer particle are formed, the monomer concentration is maintained to be present at a level of equal to or less than 4.4 grams.

Accordingly, as polymerization progress in the emulsion polymerizations disclosed herein monomer concentration preferably remains between 20% by weight and 40% by weight relative to the polymer present. That is, an excess of monomer is present relative to the growing or existing polymer chains but only to the level of 20% to 40% by weight. When monomer feeding is stopped, monomer is depleted, and monomer concentration progress towards zero, more typically around 5% to 10% by weight relative to the polymer chains present.

Figure 2:
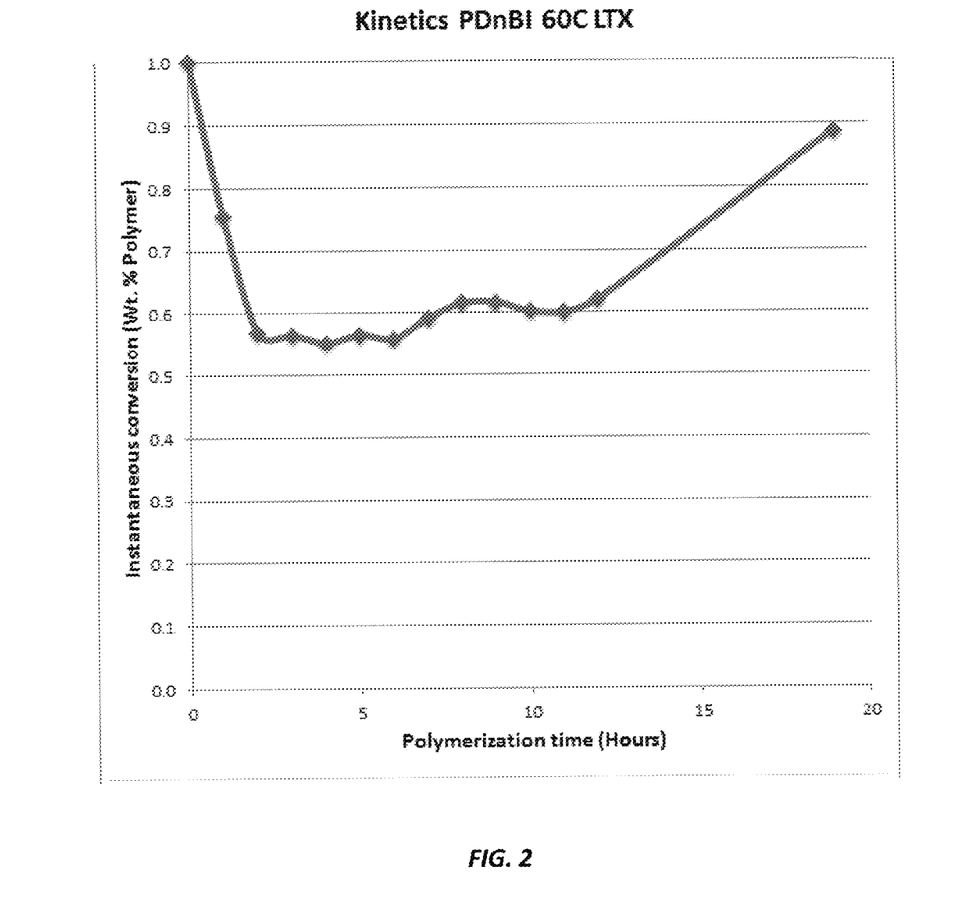
FIG. 2 is a plot of instantaneous conversion (wt. % polymer) versus polymerization time for the polymerization of poly-di-n-butyl itaconate in a seeded system at 60° C. by emulsion polymer.

An equivalent trend is presented in FIG. 2 where instantaneous conversion is observed to be greater than 56.0 wt % all the time in the case of a seeded emulsion polymerization of DnBI at 60° C., corresponding to a monomer concentration bellow 44.0 wt % at all times.

Accordingly, in the emulsion polymerization procedures herein, 90.0% by weight to 100% by weight of the polymer is ultimately produced in a nanoparticle form where the monomer concentration is then less than 44.0% by weight. This results in a substantive difference of micro environment for a growing polymer radical (monomer rich in bulk versus monomer poor in the emulsion polymerization disclosed herein). This difference of microenvironment is believed unique and primarily syndiotactic polyalkyl itaconate polymers are still produced under these conditions and the primarily polyalkyl itaconate polymers are also made at relative high values of molecular weight (Mw values greater than 30,000 and in the range of 30,000 to 1,000,000 g/mole).

Stated another way, for the emulsion polymerizations described herein, the rate of monomer addition ($R_{M\text{-}addition}$) can be made equal to the $R_{poly}$ and in addition, $R_{M\text{-}addition}$ can also be increased up to 50% greater than the $R_{poly}$, and relatively high MW (Mw>30,000) and relatively high syndiotacticty ($^{13}$C NMR syndiotactic triads of greater than or equal to 58%) can be achieved.

What is claimed is:

1. A method for polymerization comprising:
   (a) supplying a first monomer having the following structure:

wherein $R_1$ and $R_2$ are selected from an alkyl group or an aromatic group or a cylic alkyl group and combinations thereof and $R_3$ is selected from an alkyl group, aromatic functionality, heteroaromatic functionality, cyclic alkyl group, heterocyclic group or combinations thereof;
   (b) a second monomer having the following structure:

wherein $R_4$ is selected from a hydrogen, alkyl group, aromatic group or itself providing carboxylic acid functionality;
   (c) optionally, one or more monomers comprising a radically polymerizable vinyl type monomer;
   forming an emulsion of (a), (b) and optionally (c) by placing said monomers in water along with a surfactant and a water soluble free radical initiator and polymerizing said monomers at a temperature at or below 60° C. and forming a corresponding random copolymer structure:

wherein $R_5$ is a hydrogen atom or an alkyl group or a substituent containing a vinyl group and $R_6$ is an aromatic ring, an ester group, a nitrile group, a substituent containing a vinyl group and/or and acetate group, the value of "a" is such that the indicated repeat unit is present at a level of greater than 50 wt. %, the value of "b" is such that the indicated repeat unit is present at a level of 0.05 to 5.0 wt. %, and the balance is repeat unit "c" which may be present at a level of 0.0 wt % to 49.85 wt. %; and wherein said polymeric structure is in the form of particles having a particle size of 10 nm to 900 nm and at a weight average molecular weight value of greater than or equal to 30,000 g/mole and contains $^{13}C$ NMR syndiotactic triad levels equal to or above 58%.

2. The method of claim 1 wherein said polymeric particles have a Mw in the range of 30,000 to 1,000,000 g/mole.

3. The method of claim 1 wherein said polymerization proceeds under the conditions wherein the concentration of monomers (a), (b) and optionally (c) is maintained at or below 44.0 wt. % of the polymeric particles formed.

* * * * *